US008557441B2

(12) United States Patent
Liu et al.

(10) Patent No.: US 8,557,441 B2
(45) Date of Patent: Oct. 15, 2013

(54) TITANIA-GRAPHENE ANODE ELECTRODE PAPER

(75) Inventors: Jun Liu, Richland, WA (US); Daiwon Choi, State College, PA (US); Wendy D Bennett, Kennewick, WA (US); Gordon L Graff, West Richland, WA (US); Yongsoon Shin, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 337 days.

(21) Appl. No.: 12/901,527

(22) Filed: Oct. 9, 2010

(65) Prior Publication Data

US 2012/0088158 A1    Apr. 12, 2012

(51) Int. Cl.
*H01M 4/13* (2010.01)
*H01M 4/58* (2010.01)
*H01M 4/02* (2006.01)
*H01M 6/00* (2006.01)
*H01M 10/00* (2006.01)

(52) U.S. Cl.
USPC ...... 429/231.5; 429/122; 429/209; 429/218.1

(58) Field of Classification Search
USPC .............................. 429/122, 209, 218.1, 231.5
See application file for complete search history.

(56) References Cited

U.S. PATENT DOCUMENTS

| 5,972,088 | A | 10/1999 | Krishnan et al. |
|---|---|---|---|
| 6,264,741 | B1 | 7/2001 | Brinker et al. |
| 6,492,014 | B1 | 12/2002 | Rolison et al. |
| 7,001,669 | B2 | 2/2006 | Lu et al. |
| 7,094,499 | B1 | 8/2006 | Hung |
| 7,176,245 | B2 | 2/2007 | Stucky et al. |
| 7,309,830 | B2 | 12/2007 | Zhang et al. |
| 7,623,340 | B1 | 11/2009 | Song et al. |
| 8,257,867 | B2 | 9/2012 | Liu et al. |
| 2002/0022122 | A1 | 2/2002 | Hirata et al. |
| 2002/0054995 | A1 | 5/2002 | Mazurkiewicz |
| 2003/0086859 | A1 | 5/2003 | Kawakami et al. |
| 2004/0120880 | A1 | 6/2004 | Zhang et al. |
| 2004/0131934 | A1 | 7/2004 | Sugnaux et al. |
| 2004/0137225 | A1 | 7/2004 | Balkus, Jr. et al. |
| 2004/0150140 | A1 | 8/2004 | Zhan et al. |

(Continued)

FOREIGN PATENT DOCUMENTS

| CN | 1483212 | 3/2004 |
|---|---|---|
| CN | 1588679 | 3/2005 |

(Continued)

OTHER PUBLICATIONS

Wang et al. (ACS Nano vol. 3 No. 4 pp. 907-914 Online Mar. 26, 2009).*

(Continued)

*Primary Examiner* — Patrick Ryan
*Assistant Examiner* — Aaron Greso
(74) *Attorney, Agent, or Firm* — Klarquist Sparkman, LLP (57) ABSTRACT

A method for forming a nanocomposite material, the nanocomposite material formed thereby, and a battery made using the nanocomposite material. Metal oxide and graphene are placed in a solvent to form a suspension. The suspension is then applied to a current collector. The solvent is then evaporated to form a nanocomposite material. The nanocomposite material is then electrochemically cycled to form a nanocomposite material of at least one metal oxide in electrical communication with at least one graphene layer.

16 Claims, 5 Drawing Sheets

(56) References Cited

U.S. PATENT DOCUMENTS

| | | | |
|---|---|---|---|
| 2006/0154071 | A1 | 7/2006 | Homma et al. |
| 2007/0092432 | A1 | 4/2007 | Prud'homme et al. |
| 2007/0158618 | A1 | 7/2007 | Song et al. |
| 2007/0212538 | A1 | 9/2007 | Niu |
| 2007/0281854 | A1 | 12/2007 | Harbour et al. |
| 2008/0063585 | A1 | 3/2008 | Smalley et al. |
| 2008/0258359 | A1 | 10/2008 | Zhamu et al. |
| 2008/0279756 | A1 | 11/2008 | Zhamu et al. |
| 2008/0302561 | A1 | 12/2008 | Prud'homme et al. |
| 2008/0312368 | A1 | 12/2008 | Prud'homme et al. |
| 2009/0117467 | A1 | 5/2009 | Zhamu et al. |
| 2009/0246625 | A1 | 10/2009 | Lu |
| 2009/0290897 | A1 | 11/2009 | Doshoda et al. |
| 2009/0291270 | A1* | 11/2009 | Zettl et al. .................. 428/195.1 |
| 2009/0297947 | A1 | 12/2009 | Deng et al. |
| 2009/0303660 | A1 | 12/2009 | Nair et al. |
| 2010/0081057 | A1 | 4/2010 | Liu et al. |
| 2010/0143798 | A1 | 6/2010 | Zhamu et al. |
| 2010/0159366 | A1 | 6/2010 | Shao-Horn et al. |
| 2010/0176337 | A1 | 7/2010 | Zhamu et al. |
| 2011/0033746 | A1 | 2/2011 | Liu et al. |
| 2011/0045347 | A1 | 2/2011 | Liu et al. |
| 2011/0051316 | A1 | 3/2011 | Liu et al. |
| 2011/0052981 | A1 | 3/2011 | Lopez et al. |
| 2011/0111299 | A1 | 5/2011 | Liu et al. |
| 2012/0295027 | A1 | 11/2012 | Liu et al. |
| 2012/0295096 | A1 | 11/2012 | Liu et al. |
| 2012/0305165 | A1 | 12/2012 | Liu et al. |

FOREIGN PATENT DOCUMENTS

| | | |
|---|---|---|
| CN | 1793451 | 6/2006 |
| CN | 101048055 | 10/2007 |
| CN | 101139090 | 3/2008 |
| JP | 10233211 | 9/1998 |
| WO | WO2007/015710 | 2/2007 |
| WO | WO2007/061945 | 5/2007 |
| WO | WO2008/106991 | 9/2008 |
| WO | WO2009/023051 | 2/2009 |
| WO | WO2009/085015 | 7/2009 |
| WO | WO2010/014215 | 2/2010 |
| WO | WO2010/030361 | 3/2010 |
| WO | WO2011/019764 | 2/2011 |
| WO | WO2011/019765 | 2/2011 |

OTHER PUBLICATIONS

The Free Dictionary (Collins English Dictionary Entry, 2003-taken as available by Dec. 2003—{http://www.thefreedictionary.com/slurry} printed Mar. 27, 2013).*
Final Office action from U.S. Patent and Trademark Office for U.S. Appl. No. 12/462,857, mailed Aug. 23, 2012.
Final Office action from U.S. Patent and Trademark Office for U.S. Appl. No. 12/553,527, mailed Nov. 20, 2012.
Final Office action from U.S. Patent and Trademark Office for U.S. Appl. No. 12/852,794, mailed Jul. 3, 2012.
International Preliminary Report on Patentability and Written Opinion for PCT/US2009/004369 (mailed Feb. 10, 2011).
International Preliminary Report on Patentability and Written Opinion for PCT/US2010/045088 (mailed Feb. 23, 2012).
International Preliminary Report on Patentability and Written Opinion for PCT/US2010/045089 (mailed Feb. 23, 2012).
Kang et al., "The Cycling Performance of Graphite Electrode Coated with Tin Oxide for Lithium Ion Battery," *Journal of the Korean Electrochemical Society*, 5(2):52-56 (May 2002).
Lee, "Dispersion of Sn and SnO on carbon anodes," *Journal of Power Sources*, 90(1):70-75 (Sep. 2000).
McDermott et al., "Electron Transfer Kinetics of Aquated $Fe^{+3/+2}$, $Eu^{+3/+2}$, and $V^{+3/+2}$ at Carbon Electrodes," *Journal of the Electrochemical Society*, 140(9):2593-2599 (Sep. 1993).
Mdleleni et al., "Sonochemical Synthesis of Nanostructured Molybdenum Sulfide," *Journal of the American Chemical Society*, 12:6189-6190 (Jun. 1998).

Mockensturm et al., "Van Der Waals' Elastica," *2005 ASME International Mechanical Engineering Congress and Exposition*, 277-291 (Nov. 5-11, 2005).
Murakami et al., "Formation of Positronium in Cup-stacked Carbon Nanofibers," (Abstract and Introduction Only) *Materials Science Forum*, 445-446:331-333 (Jan. 2004).
Nakahara et al., "Structural changes of a pyrolytic graphite surface oxidized by electrochemical and plasma treatment," *Journal of Materials Science*, 29(12):3193-3199 (Jun. 1994).
Notice of Allowance from U.S. Patent and Trademark Office for U.S. Appl. No. 12/460,993, mailed Jul. 11, 2012.
Office action from the Chinese Patent Office for Chinese Patent Application No. 200980135205.8, mailed Nov. 14, 2012.
Office action from the Chinese Patent Office for Chinese Patent Application No. 200980129673.4, mailed Sep. 10, 2012.
Office action from U.S. Patent and Trademark Office for U.S. Appl. No. 12/553,527, mailed Jun. 1, 2012.
Office action from U.S. Patent and Trademark Office for U.S. Appl. No. 12/901,526, mailed Dec. 3, 2012.
Office action from U.S. Patent and Trademark Office for U.S. Appl. No. 13/559,528, mailed Jan. 10, 2013.
Office action from U.S. Patent and Trademark Office for U.S. Appl. No. 13/585,741, mailed Jan. 14, 2013.
Ou et al., "Characteristics of graphene-layer encapsulated nanoparticles fabricated using laser ablation method," *Diamond and Related Materials*, 17(4-5):664-668 (Apr.-May 2008).
Shao, "Influencing Surface Tension," *California State Science Fair 2006 Project Summary* Project No. J0531 http://www.usc.edu/CSSF/History/2006/Projects/J0531.pdf (Apr. 2006).
Slack, "Thermal Conductivity of Pure and Impure Silicon, Silicon Carbide, and Diamond," *Journal of Applied Physics*, 35(12):3460-3466 (Dec. 1964).
Suslick et al., "Sonochemical synthesis of amorphous iron," *Nature*, 353:414-416 (Oct. 1991).
USP, "Material Safety Data Sheet—Sodium Lauryl Sulfate," Catalog No. 1614363 (Oct. 28, 2010).
Wakihara et al., "Lithium Ion Batteries Fundamentals and Performance," Wiley-VCH, New York (1998).
Walker, *Just the Facts 101 Textbook Key Facts, Physics*, vol. 1, Chapter 15 Fluids, p. 13 http://books.google.com/books?id=fhRX6IFg2fcC&pg=PT278lpg=PT278& dq=%22 Surfactants+are+compounds+that+lower+the+surface+tension+of+a+liquid%22+-2012+-2011+-2010+-2009&source=bl&ots=cVS1AJ-Gos&sig=e9wgCJ khGYTe2zdqoq 11y-iQG1o&hl=en&sa=X&ei=-6ErUO6NO6 Wo0AGh74D4Bw&ved= OCEUQ6AEw BA#v=onepage&q=%22Surfactants%20are%20 compounds% 20that%20lower%20the%20surface%20tension%20of%20a%20liquid%22%20-20-2012%20-2011%20-2010%20/2009&f=false.
Yao et al., "In situ chemical synthesis of $SnO_2$-graphene nanocomposite as anode materials for lithium-ion batteries," *Electrochemistry Communications*, 11:1849-1852 (Aug. 2009).
Yu et al., "Mesoporous tin oxides as lithium intercalation anode materials," *Journal of Power Sources*, 104:97-100 (Jan. 2002).
Aksay et al., "Biomimetic Pathways for Assembling Inorganic Thin Films," *Science* 273:892-898 (Aug. 1996).
Aricò et al., "Nanostructured materials for advanced energy conversion and storage devices," *Nature Materials* 4:366-377 (May 2005).
Armstrong et al., "$TiO_2$-B Nanowires," *Angewandte Chemie-International Edition* 43:2286-2288 (Apr. 2004).
Armstrong et al., "$TiO_2$(B) Nanowires as an Improved Anode Material for Lithium-Ion Batteries Containing LiFePO4 or $LiNi_{0.5}Mn_{1.5}O_4$ Cathodes and a Polymer Electrolyte," *Advanced Materials* 18:2597-2600 (Oct. 2006).
Asefa et al., "Periodic mesoporous organosilicas with organic groups inside the channel walls," *Nature* 402:867-871 (Dec. 1999).
Atkin et al., "Self-Assembly of a Nonionic Surfactant at the Graphite/Ionic Liquid Interface," *Journal of the American Chemical Society* 127:11940-11941 (Aug. 2005).
Attard et al., "Mesoporous Platinum Films from Lyotropic Liquid Crystalline Phases," *Science* 278:838-840 (Oct. 1997).
Bagshaw et al., "Templating of Mesoporous Molecular Sieves by Nonionic Polyethylene Oxide Surfactants," *Science* 269:1242-1244 (Sep. 1995).

(56) References Cited

OTHER PUBLICATIONS

Baudrin et al., "Structural evolution during the reaction of Li with nano-sized rutile type TiO2 at room temperature," *Electrochemistry Communications* 9:337-342 (Feb. 2007).
Berger et al., "Electronic Confinement and Coherence in Patterned Epitaxial Graphene," *Science* 312:1191-1196 (May 2006).
Bizdoaca et al., "Magnetically directed self-assembly of submicron spheres with a $Fe_3O_4$ nanoparticle shell," *Journal of Magnetism and Magnetic Materials*, 240(1-3):44-46 (Feb. 2002).
Bonard et al., "Purification and Size-Selection of Carbon Nanotubes," *Advanced Materials* 9(10):827-831 (month unknown 1997).
Braun et al., "Semiconducting superlattices template by molecular assemblies," *Nature* 380:325-328 (Mar. 1996).
Chen et al., "Mechanically Strong, Electrically Conductive, and Biocompatible Graphene Paper," *Advanced Materials* 20:3557-3561 (Jul. 2008).
Chen et al., "Reducing Carbon in $LiFePO_4$/C Composite Electrodes to Maximize Specific Energy, Volumetric Energy, and Tap Density," *Journal of the Electrochemical Society* 149(9):A1184-A1189 (Sep. 2002).
Choi et al., "Li-ion batteries from $LiFePO_4$ cathode and anatase/graphene composite anode for stationary energy storage," *Electrochemistry Communications* 12(3):378-381 (Jan. 2010).
Decher, "Fuzzy Nanoassemblies: Toward Layered Polymeric Multicomposites," *Science* 277(9):1232-1237 (Aug. 1997).
Dikin et al., "Preparation and characterization of graphene oxide paper," *Nature* 448:457-460 (Jul. 2007).
Dominko et al., "Impact of the Carbon Coating Thickness on the Electrochemical Performance of $LiFePO_4$/C Composites," *Journal of the Electrochemical Society*, 152(3):A607-A610 (Jan. 2005).
Erjavec et al., "$RuO_2$-wired high-rate nanoparticulate $TiO_2$ (anatase): Suppression of particle growth using silica," *Electrochemistry Communications*, 10:926-929 (Jun. 2008).
Franger et al., "Optimized Lithium Iron Phosphate for High-Rate Electrochemical Application," *Journal of the Electrochemical Society*, vol. 151, No. 7, pp. A1024-A1027 (May 2004).
Gòmez-Navarro et al., "Electronic Transport Properties of Individual Chemically Reduced Graphene Oxide Sheets," *Nano Letters*, 7(11):3499-3503 (Oct. 2007).
Goncalves et al., "Surface modification of graphene nanosheets with gold nanoparticles: the role of oxygen moieties at graphene surface on gold nucleation and growth," *Chem. Mater*, 21(20):4796-4802 (Sep. 2009).
Goward et al., "Poly(pyrrole) and poly(thiophene)/vanadium oxide interleaved nanocomposites: positive electrodes for lithium batteries," *Electrochimica Acta* 43(10-11):1307-1303 (Apr. 1998).
Guo et al., "Superior Electrode Performance of Nanostructured Mesoporous $TiO_2$ (Anatase) through Efficient Hierarchical Mixed Conducting Networks," *Advanced Materials* 19:2087-2091 (Jul. 2007).
Herle et al., "Nano-network electronic conduction in iron and nickel olivine phosphates," *Nature Materials* 3:147-152 (Feb. 2004).
Hu et al., "High Lithium Electroactivity of Nanometer-Sized Rutile $TiO_2$," *Advanced Materials* 18:1421-1426 (Apr. 2006).
Hu et al., "Improved Electrode Performance of Porous $LiFePO_4$ Using $RuO_2$ as an Oxidic Nanoscale Interconnect," *Advanced Materials* 19:1963-1966 (Jul. 2007).
Huang et al., "Self-organizing high-density single-walled carbon nanotube arrays from surfactant suspensions," *Nanotechnology* 15:1450-1454 (Nov. 2004).
Huo et al., "Organization of Organic Molecules with Inorganic Molecular Species into Nanocomposite Biphase Arrays," *Chemistry Materials* 6:1176-1191 (Aug. 1994).
International Preliminary Report on Patentability and Written Opinion for PCT/US2009/005085 (mailed Mar. 24, 2011).
International Search Report and Written Opinion for PCT/US2009/004369 (mailed Jan. 29, 2010).
International Search Report for PCT/US2009/005085 (mailed Feb. 4, 2010).
International Search Report for PCT/US2010/045088 (mailed Oct. 6, 2010).
International Search Report for PCT/US2010/045089 (mailed Oct. 27, 2010).
International Search Report and Written Opinion for PCT/US2011/047144 (mailed Feb. 23, 2012).
International Search Report and Written Opinion for PCT/US2011/055216 (mailed Apr. 23, 2012).
International Search Report and Written Opinion for PCT/US2011/62016 (mailed Apr. 9, 2012).
Jiang et al., "Nanocrystalline Rutile $TiO_2$ Electrode for High-Capacity and High-Rate Lithium Storage," *Electrochemical and Solid-State Letters* 10(5):A127-A129 (Mar. 2007).
Kavan et al., "Nanocrystalline $TiO_2$ (Anatase) Electrodes: Surface Morphology, Adsorption, and Electrochemical Properties," *Journal of the Electrochemical Society* 143(2):394-400 (Feb. 1996).
Kou et al., "Stabilization of Electrocatalytic Metal Nanoparticles at Metal—Metal Oxide—Graphene Triple Junction Points," *JACS*, 133(8):254-2547(Feb. 2011).
Kresge et al., "Ordered mesoporous molecular sieves synthesized by a liquid-crystal template mechanism," *Nature* 359:710-712 (Oct. 1992).
Leroux et al., "Electrochemical Lithium Intercalation into a Polyaniline/$V_2O_5$ Nanocomposite," *J. Electrochemical Society* 143(9):L181-L183 (Sep. 1996).
Li et al., "Battery performance and photocatalytic activity of mesoporous anatase $TiO_2$ nanospheres/graphene composites by template-free self-assembly," *Adv. Funct. Mater.*, 21(9):1717-1722 (Mar. 2011).
Li et al., "$MoS_2$ nanoparticles grown on graphene: an advanced catalyst for the hydrogen evolution reaction," *J. Am. Chem. Soc.*, 133(19):7296-7299 (Apr. 2011).
Li et al., "Processable aqueous dispersions of graphene nanosheets," *Nature Nanotechnology* 3:101-105 (Jan. 2008).
Liang et al., "$Co_3O_4$ nanocrystals on graphene as a synergistic catalyst for oxygen reduction reaction," *Nature Mater.*, 10:780-786 (Oct. 2011).
Lindsay, "Data analysis and anode materials for lithium ion batteries," PhD Thesis, University of Wollongong Thesis Collection, Ch. 2, Section 2.5.5, http://ro.uow.edu.au/theses/359 (2004).
Liu et al., "Oriented Nanostructures for Energy Conversion and Storage," *ChemSusChem*, 1:676-697 (Aug. 2008).
Lou et al., "Template-Free Synthesis of $SnO_2$ Hollow Nanostructures with High Lithium Storage Capacity," *Advanced Materials* 18:2325-2329 (Aug. 2006).
Maier et al., "Nanoionics: ion transport and electrochemical storage in confined systems," *Nature Materials* 4:805-815 (Nov. 2005).
Mao et al., "Structural, electronic and magnetic properties of manganese doping in the upper layer of bilayer graphene," *Nanotechnology* 19(20):205708-205715 (May 2008).
McAllister et al., "Single Sheet Functionalized Graphene by Oxidation and Thermal Expansion of Graphite," *Chemical Materials* 19:4396-4404 (May 2007).
Moriguchi et al., "A Mesoporous Nanocomposite of $TiO_2$ and Carbon Nanotubes as a High-Rate Li-Intercalation Electrode Material," *Advanced Materials* 18:69-73 (Jan. 2006).
Moskon et al., "Citrate-Derived Carbon Nanocoatings for Poorly Conducting Cathode," *Journal of the Electrochemical Society* 153(10):A1805-A1811 (Jul. 2006).
Nethravathi, et al., "Graphite Oxide-Intercalated Anionic Clay and Its Decomposition to Graphene-Inorganic Material Nanocomposites," *Langmuir* 24:8240-8244 (Aug. 2008).
Nishihara et al., "Carbon-coated mesoporous silica with hydrophobicity and electrical conductivity," *Carbon* 46(1):pp. 48-53 (Jan. 2008).
Niyogi et al., "Solution Properties of Graphite and Graphene," *Journal of the American Chemical Society* 128:7720-7721 (Jan. 2006).
Novoselov et al., "Electric Field Effect in Atomically Thin Carbon Films," *Science* 306:666-669 (Oct. 2004).
Office action from U.S. Patent and Trademark Office for U.S. Appl. No. 12/460,993, mailed Jan. 19, 2012.
Office action from U.S. Patent and Trademark Office for U.S. Appl. No. 12/462,857, mailed Jan. 10, 2012.

(56) References Cited

OTHER PUBLICATIONS

Office action from U.S. Patent and Trademark Office for U.S. Appl. No. 12/553,527, mailed Nov. 10, 2011.
Office action from U.S. Patent and Trademark Office for U.S. Appl. No. 12/852,794, mailed Jan. 23, 2012.
Paek et al., "Enhanced Cyclic Performance and Lithium Storage Capacity of $SnO_2$/Graphene.Nanoporous Electrodes with Three-Dimensionally Delaminated Flexible Structure," *Nano Letters* 9(1):72-75 (Dec. 2008).
Peigney et al., "Specific surface area of carbon nanotubes and bundles of carbon nanotubes," *Carbon* 39:507-514 (Apr. 2001).
Prosini et al., "Improved electrochemical performance of a $LiFePO_4$-based composite cathode," *Electrochimica Acta* 46:3517-3523 (Aug. 2001).
Ramanathan et al., "Functionalized graphene sheets for polymer nanocomposites," *Nature Nanotechnology* 3:327-331 (May 2008).
Read et al., "$SnO_2$-carbon composites for lithium-ion battery anodes," *Journal of Power Sources* 96:277-281 (Jun. 2001).
Reddy et al., "Room temperature synthesis and Li insertion into nanocrystalline rutile $TiO_2$," *Electrochemistry Communications* 8:1299-1303 (Aug. 2006).
Restriction Requirement from the U.S. Patent and Trademark Office for U.S. Appl. No. 12/462,857, mailed Aug. 22, 2011.
Restriction Requirement from the U.S. Patent and Trademark Office for U.S. Appl. No. 12/553,527, mailed Sep. 26, 2011.
Richard et al., "Supramolecular Self-Assembly of Lipid Derivatives on Carbon Nanotubes," *Science* 300:775-778 (May 2003).
Ribeiro et al., "Assembly and Properties of Nanoparticles," *Nanostructure Science and Technology*, 33-79, see 62-63, 77 (2009).
Sakamoto et al., "Hierarchical battery electrodes based on inverted opal structures," Journal of Materials Communication 12:2859-2861 (Aug. 2002).
Schniepp et al., "Functionalized Single Graphene Sheets Derived from Splitting Graphite Oxide," *The Journal of Physical Chemistry Letters* 110:8535-8539 (Apr. 2006).
Schniepp et al., "Self-Healing of Surfactant Surface Micelles on Millisecond Time Scales," *Journal of the American Chemical Society* 128:12378-12379 (Aug. 2006).
Si, et al., "Synthesis of Water Soluble Graphene," *Nano Letters* 8(6):1679-1682 (May 2008).
Srinivas, et al., "Molecular Dynamics Simulations of Surfactant Self-Organization at a Solid—Liquid Interface," *Journal of the American Chemical Society* 128(3):848-853 (Jan. 2006).
Stankovich et al., "Graphene-based composite materials," *Nature* 442:282-286 (Jul. 2006).
Stankovich et al., "Stable aqueous dispersions of graphitic nanoplatelets via the reduction of exfoliated graphite oxide in the presence of poly(sodium 4-styrenesulfonate)," *Journal of Materials Chemistry* 16:155-158 (document marked Nov. 2005).
Stoller et al., "Graphene-Based Ultracapacitors," *Nano Letters* 8(10):3498-3502 (Sep. 2008).
Superior Graphite Company, "Development of Low cost Carbonaceous Materials for Anodes in Lithium-Ion Batteries for Electric and Hybrid Electric Vehicles," DE-F02-00EE50630, 50 pages (Dec. 10, 2002).
Suzuki et al., "$H\text{-}T$ phase diagram and the nature of vortex-glass phase in a quasi-two-dimensional superconductor: Sn-metal layer sandwiched between graphene sheets," *Physica C: Superconductivity* 402(3):243-256 (Nov. 2003).
Tanaka et al., "Characteristics of graphene-layer encapsulated nanoparticles fabricated using laser ablation method," *Diamond and Related Materials* 17(4-5):664-668 (Nov. 2007).
Tarascon et al., "Issues and challenges facing rechargeable lithium batteries," *Nature* 414:359-367 (Nov. 2001).
Tung et al., "Low-temperature solution processing of graphene-carbon nanotube hybrid materials for high-performance transparent conductors," *Nano Lett.*, 9(5):1949-1955 (Apr. 2009).
U.S. Appl. No. 12/980,328, filed Dec. 28, 2010.

Wang, et al., "Atomic Layer Deposition of Metal Oxides on Pristine and Functionalized Graphene," *Journal of the American Chemical Society* 130:8152-8153 (Jun. 2008).
Wang, et al., "Cooperative Self-Assembly of Tertiary Systems: Novel Graphene-Metal Oxide Nanocomposites," Pacific Northwest National Laboratory and Princeton University 21 pages (date unknown).
Wang et al., "Graphene Oxide-Periodic Mesoporous Silica Sandwich Nanocomposites with Vertically Oriented Channels," *ACS Nano*, 4(12):7437-7450 (Nov. 2010).
Wang et al., "Graphene-wrapped sulfur particles as a rechargeable lithium-sulfur battery cathode material with high capacity and cycling stability," *Nano Lett.*, 11(7):2644-2647 (Jun. 2011).
Wang et al., "$LiMn_{1-x}Fe_xPO_4$ nanorods grown on graphene sheets for ultrahigh-rate-performance lithium ion batteries," *Angew. Chem. Int. Ed.*, 50:7364-7368 (Jun. 2011).
Wang et al., "Low-Temperature Synthesis of Tunable Mesoporous Crystalline Transition Metal Oxides and Applications as Au Catalyst Supports," *Chemistry of Materials* 20:13499-13509 (Aug. 2008).
Wang et al., "Microemulsion Syntheses of Sn and $SnO_2$-Graphite Nanocomposite Anodes for Li-Ion Batteries," *Journal of the Electrochemical Society*, 151(4):A563-A570 (Feb. 20, 2004).
Wang et al., "$Mn_3O_4$-graphene hybrid as a high-capacity anode material for lithium ion batteries," *J. Am. Chem. Soc.*, 132(40):13978-13980 (Sep. 2010).
Wang et al., "$Ni(OH)_2$ nanoplates grown on graphene as advanced electrochemical pseudocapacitor materials," *J. Am. Chem. Soc.*, 132(21):7472-7477 (May 2010).
Wang et al., "Self-Assembled TiO-Graphene Hybrid Nanostructures for Enhanced Li-Ion Insertion," *ACS Nano*, 3(4):907-914 (Mar. 26, 2009).
Wang et al., "Sn/graphene nanocomposite with 3D architecture for enhanced reversible lithium storage in lithium ion batteries," *J. Mater. Chem.*, 19:8378-8384 (Oct. 2009).
Wang, et al., "Surface-Mediated Growth of Transparent, Oriented, and Well-Defined Nanocrystalline Anatase Titania Films," *Journal of the American Chemical Society* 128:13670-13671 (Oct. 2006).
Wang, et al., "Synthesis and Li-Ion Insertion Properties of Highly Crystalline Mesoporous Rutile $TiO_2$," *Chem. Mater.*, 20:3435-3442 (May 2008).
Wang et al., "Ternary self-assembly of ordered metal oxide-graphene nanocomposites for electrochemical energy storage," *ACS Nano*, 4(3):1587-1595 (Feb. 2010).
Wang et al., "Tin Nanoparticle Loaded Graphite Anodes for Li-Ion Battery Applications," *Journal of the Electrochemical Society*, vol. 151, No. 11, pp. A563-A570 (Oct. 4, 2004).
Watcharotone et al., "Graphene-Silica Composite Thin Films as Transparent Conductors," *Nano Letters* 7(7)1888-1892 (Jun. 2007).
Whitesides, et al., "Molecular Self-Assembly and Nanochemistry: A Chemical Strategy for the Synthesis of Nanostructures," *Science* 254:1312-1319 (Nov. 1991).
Williams, et al., "$TiO_2$-Graphene Nanocomposites. UV-Assisted Photocatalytic Reduction of Graphene Oxide," *Acs Nano* 2(7):1487-1491 (Jul. 2008).
Xu et al., "Assembly of chemically modified graphene: methods and applications," *J. Mater. Chem.*, 21:3311-3323 (Mar. 2011).
Xu, et al., "Flexible Graphene Films via the Filtration of Water-Soluble Noncovalent Functionalized Graphene Sheets," Journal of the American Chemical Society 130:5856-5857 (Apr. 2008).
Yamabi, et al., "Crystal Phase Control for Titanium Dioxide Films by Direct Deposition in Aqueous Solutions," *Chemical Materials* 14:609-614 (Jan. 2002).
Yang, et al., "Generalized syntheses of large-pore mesoporous metal oxides with semicrystalline frameworks," *Nature* 396:152-155 (Nov. 1998).
Yoo, et al., "Large Reversible Li Storage of Graphene Nanosheet Families for Use in Rechargeable Lithium Ion Batteries," *Nano Letters* 8(8):2277-2282 (Aug. 2008).
Zhao et al., "Triblock Copolymer Syntheses of Mesoporous Silica with Periodic 50 to 300 Angstrom Pores," *Science* 279:548-552 (Jan. 1998).

(56) References Cited

OTHER PUBLICATIONS

Zhou et al., "Lithium Insertion into $TiO_2$ Nanotube Prepared by the Hydrothermal Process," *Journal of the Electrochemical Society* 150(9):A1246-A1249 (Jul. 2003).

Zhu et al., "Nanostructured reduced graphene oxide/$Fe_2O_3$ composite as a high-performance anode material for lithium ion batteries," *ACS Nano*, 5(4):3333-3338 (Mar. 2011).

Zukalova et al., "Pseudocapacitive Lithium Storage in $TiO_2(B)$," *Chemistry of Materials* 17:1248-1255 (Feb. 2005).

\* cited by examiner

TITANIA-GRAPHENE ANODE ELECTRODE PAPER

The invention was made with Government support under Contract DE-ACO5-76RL0-1830, awarded by the U.S. Department of Energy. The Government has certain rights in the invention.

TECHNICAL FIELD

This invention relates to nanocomposite materials with unique and useful electrochemical properties. These nanocomposite materials are formed of graphene and metal oxides. The invention has particular utility when used in batteries and particularly in lithium ion batteries.

BACKGROUND OF THE INVENTION

There have been a number of examples of methods for forming nanomaterials using graphene and metal oxides to take advantage of the unique electrochemical properties of graphene. For example, U.S. patent application Ser. No. 12/462,857 filed Aug. 10, 2009 describes nanocomposite materials having at least two layers. Each layer consists of one metal oxide bonded to at least one graphene layer. The nanocomposite materials will typically have many alternating layers of metal oxides and graphene layers, bonded in a sandwich type construction and will be incorporated into a electrochemical or energy storage device.

U.S. patent application Ser. No. 12/553,527 filed Sep. 3, 2009 describes a nanocomposite material formed of graphene and a mesoporous metal oxide having a demonstrated specific capacity of more than 200 F/g with particular utility when employed in supercapacitor applications. These nanocomposite materials by forming a mixture of graphene, a surfactant, and a metal oxide precursor and then precipitating the metal oxide precursor with the surfactant from the mixture to form a mesoporous metal oxide. The mesoporous metal oxide is then deposited onto a surface of the graphene.

These and other prior art devices typically form the nanocomposite materials using a metal oxides in a salt form, such as lithium titanate ($Li_4Ti_5O_{12}$,) as a precursor material. While this $Li_4Ti_5O_{12}$ material has been shown to work well in these applications, it is expensive and thus may not be suited for certain high volume applications.

Many of these metal oxides are widely known as inexpensive materials, but are also widely known as poor electrical conductors. For example, titania of the form $TiO_x$ in its common forms of its anatase or rutile is widely known as an inexpensive material, but is also widely known as a poor electrical conductor. Therefore, those of ordinary skill in the art have not used these metal oxides, such as titania, as an anode material, or in applications where it would be a precursor to an anode material.

Accordingly, there exists a need for low cost metal oxides that can be successfully utilized as an anode material, or as a precursor to an anode material in applications where it would be combined with graphene. The present invention fulfills that need.

SUMMARY OF THE INVENTION

The present invention is therefore a method for forming a nanocomposite material using low cost commodity chemicals as starting materials. The present invention proceeds by first providing metal oxide and graphene in a solvent to form a suspension. The suspension is then applied to a current collector. The solvent is then evaporated to form a nanocomposite material which has at least one metal oxide in electrical communication with at least one graphene layer. Preferably, the solvent is an organic solvent, the metal oxide is titania, and the titania is provided in a particle form wherein the particles have an average diameter below 50 nm, and more preferably below 10 nm.

In one embodiment, the present invention is a method for forming a nanocomposite material that includes the steps of providing metal oxide and graphene in a solvent to form a suspension. The suspension is then applied to a current collector. The solvent is then evaporated to form an anode. The anode is connected to a cathode having lithium ions and an electrolyte to form a battery. The anode is then electrochemically cycled to form a nanocomposite material of at least one metal oxide in electrical communication with at least one graphene layer.

In another embodiment, the present invention is a nanocomposite material formed by providing metal oxide and graphene in a solvent to form a suspension. The suspension is then applied to a current collector. The solvent is then evaporated to form an anode. The anode is connected to a cathode having lithium ions and an electrolyte to form a battery. The anode is then electrochemically cycled to form a nanocomposite material of at least one metal oxide in electrical communication with at least one graphene layer. Preferably, the solvent is an organic solvent, the metal oxide is titania, and the titania is provided in a particle form wherein the particles have an average diameter below 50 nm, and more preferably below 10 nm. The nanocomposite material of the forgoing embodiment may further be formed by the steps of connecting the anode to a cathode having lithium ions and an electrolyte to form a battery and electrochemically cycling the anode.

In another embodiment, the present invention is a battery formed by providing metal oxide and graphene in a solvent to form a suspension. The suspension is then applied to a current collector. The solvent is then evaporated to form an anode. A cathode and an electrolyte are then provided in electrical communication with the anode. The anode is connected to a cathode having lithium ions and an electrolyte to form a battery. The anode is then electrochemically cycled to form a nanocomposite material of at least one metal oxide in electrical communication with at least one graphene layer. Preferably, the solvent is an organic solvent, the metal oxide is titania, and the titania is provided in a particle form wherein the particles have an average diameter below 50 nm, and more preferably below 10 nm.

BRIEF DESCRIPTION OF THE DRAWINGS

The following detailed description of the embodiments of the invention will be more readily understood when taken in conjunction with the following drawing, wherein.

DETAILED DESCRIPTION OF THE PREFERRED EMBODIMENTS

For the purposes of promoting an understanding of the principles of the invention, reference will now be made to the embodiments illustrated in the drawings and specific language will be used to describe the same. It will nevertheless be understood that no limitations of the inventive scope is thereby intended, as the scope of this invention should be evaluated with reference to the claims appended hereto. Alterations and further modifications in the illustrated devices, and such further applications of the principles of the invention as illustrated herein are contemplated as would normally occur to one skilled in the art to which the invention relates.

Several experiments were conducted to demonstrate various alternative embodiments of the present invention. In the first of these experiments, an aqueous method using a film type application was shown for forming titania/graphene composites of 90/10 wt % and 72/28 wt % (P-25).

To prepare the 90:10 (wt %) titania:graphene suspensions, 23 mg graphene (Vorbeck Materials LLC) was dispersed in 50 ml H2O using 2.3 mg (10 wt %) CTAB (cetyl trimethylammonium bromide) surfactant and ultrasonicated for 15 minutes. For the 72:28 (wt %) titania:graphene suspensions, 77.8 mg of graphene (Vorbeck Materials LLC) was dispersed in 50 ml H2O using 7.78 mg CTAB (cetyl trimethylammonium bromide) surfactant and ultrasonicated for 15 minutes. In a second container, 200 mg nanosized titania powder (Degussa P25) was dispersed in 50 ml H2O by stirring and ultrasonic mixing for 10 minutes then slowly added to the graphene suspension. The final suspension was then mixed for an additional 4 hours. After mixing, the titania:graphene suspension is filtered, air dried then calcined at 400° C. in a H2/Ar atmosphere for 3 hours.

To prepare test electrodes, 0.5 ml of poly(vinylidene fluoride) (PVDF) binder dispersed in N-methylpyrrolidone (NMP) solution (0.5 g/20 ml) was added to 0.1125 g of the composite powder and homogenized for 10 minutes. The final slurry was then coated on an Al current collector using a roll applicator to a thickness of approximately 60 microns. Slurry rheology was adjusted using NMP content and viscosities in the range of approximately 1000-5000 cps, which produced good quality films. After drying on a hot plate for 5 minutes, circular test electrodes were made using a 9/16" punch. The half-cells (2325 coin cell, National Research Council, Canada) with polypropylene membrane separator (Celgard, Inc.), Li metal anode and reference in 1M LiPF6 in EC/DMC (1:1 v/v) (ethyl carbonate/dimethyl carbonate) electrolyte were assembled in a glove box (Mbraun, Inc.) filled with ultra highly purity (UHP) argon. The electrochemical performance of the TiO2/graphene anode was then evaluated using an Arbin Battery Tester BT-2000 (Arbin Inst., College Station, Tex.) at room temperature. The half-cell was tested between 3V and 1V vs. Li at various C rate current based on a theoretical capacity of 168 mAh/g (i.e., 1 C=168 mAh·g−1) for anatase. In the next set of these experiments, an aqueous method using a tape application was shown for forming titania/graphene composites of 90/10 wt % and 72/28 wt % (P-25).

To prepare the 90:10 (wt %) titania:graphene suspensions, 23 mg graphene (Vorbeck Materials LLC) was dispersed in 50 ml H2O using 2.3 mg (10 wt %) CTAB (cetyl trimethylammonium bromide) surfactant and ultrasonicated for 15 minutes. For the 72:28 (wt %) titania:graphene suspensions, 77.8 mg of graphene (Vorbeck Materials LLC) was dispersed in 50 ml H2O using 7.78 mg CTAB (cetyl trimethylammonium bromide) surfactant and ultrasonicated for 15 minutes. In a second container, 200 mg nanosized titania powder (Degussa P25) was dispersed in 50 ml H2O by stirring and ultrasonic mixing for 10 minutes then slowly added to the graphene suspension. The final suspension was then mixed for an additional 4 hours. After mixing, the titania:graphene suspension was filtered, air dried then calcined at 400° C. in a H2/Ar atmosphere for 3 hours.

For the preparation of P-25/graphene tapes (90 wt % P-25), 222.2 mg of graphene was dispersed in 250 mL H2O using 23 mg of CTAB surfactant and sonicated for 15 min. In a separate container, 2.0 g P-25 was dispersed in 100 mL water by sonication (10 min). The P-25 suspension was slowly added to the graphene dispersion upon stirring and stirred for 4 h. The slurry was filtered, air-dried, and calcined at 400° C. in a H2/Ar for 3 h.

To prepare P-25/graphene composite tapes, the calcined powder was first dispersed in water and 7 wt % of PTFE suspension (65 wt % in water, Aldrich) was added upon stirring. After 3 additional hours stirring, the mixture was filtered and dried at 90° C. for 30 min. The powder/PTFE green body was then calendared to the desired thickness (~1-100 microns) using a three-roll mill.

Circular test electrodes were made using a 9/16" punch and dried overnight at 110° C. in a vacuum oven. The half-cells (2325 coin cell, National Research Council, Canada) with polypropylene membrane separator (Celgard, Inc.), Li metal anode and reference in 1M LiPF6 in EC/DMC (1:1 v/v) (ethyl carbonate/dimethyl carbonate) electrolyte were assembled in a glove box (Mbraun, Inc.) filled with ultra highly purity (UHP) argon. The electrochemical performance of the TiO2/graphene anode was then evaluated using an Arbin Battery Tester BT-2000 (Arbin Inst., College Station, Tex.) at room temperature. The half-cell was tested between 3V and 1V vs. Li at various C rate current based on a theoretical capacity of 168 mAh/g (i.e., 1 C=168 mAh·g−1) for anatase.

Figure 5:
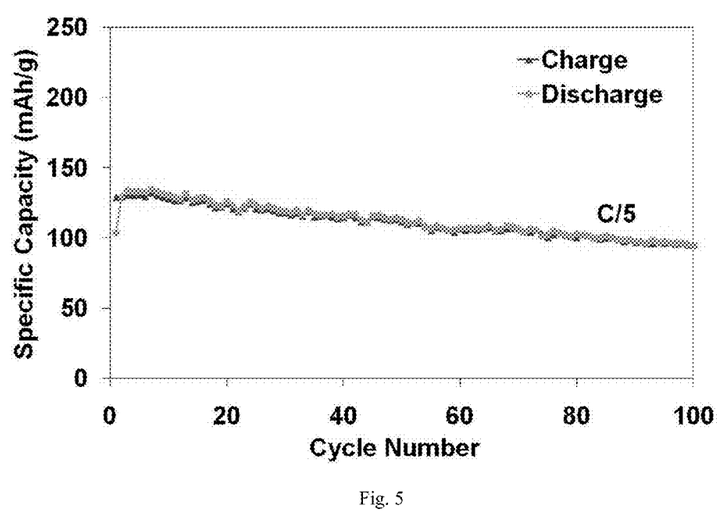
FIG. 5 is a graph of the cycling performance of TiO2/Graphene composite paper electrodes prepared from an aqueous suspension.

FIG. 5 shows the cycling performance of the titania/graphene composite anodes produced using the aqueous film method. The anode shows a good initial capacity of approximately 120 mAh/g and approximately 20% capacity fade after 100 cycle at a C/5 rate.

In the next set of these experiments, a non-aqueous method also using a film application was shown for forming titania/graphene composites of 90/10 wt % and 72/28 wt % (P-25).

Nanosized titania powder (Degussa P25) and graphene (Vorbeck Materials LLC) were dispersed in NMP using ultrasonic mixing (30 min) in 90:10 and 72:28 wt % ratios. Total solids loadings between approximately 3-12 wt % were typically used in preparing the initial suspensions. To these slurries 10 wt % (relative to the solids content) of PVDF binder was added and the mixture stirred 5-16 h and homogenized if needed. Slurry rheology was adjusted using NMP and viscosities in the range of approximately 1000-5000 cps, which produced good quality films.

The final slurry was then coated on an Al current collector using a roll applicator at a thickness of approximately 60 microns. After drying on a hot plate for 5 minutes, circular test electrodes were made using a 9/16" punch. The half-cells (2325 coin cell, National Research Council, Canada) with polypropylene membrane separator (Celgard, Inc.), Li metal anode and reference in 1M LiPF6 in EC/DMC (1:1 v/v) (ethyl carbonate/dimethyl carbonate) electrolyte were assembled in a glove box (Mbraun, Inc.) filled with ultra highly purity (UHP) argon. The electrochemical performance of the TiO2/graphene anode was then evaluated using an Arbin Battery Tester BT-2000 (Arbin Inst., College Station, Tex.) at room temperature. The half-cell was tested between 3V and 1V vs. Li at various C rate current based on a theoretical capacity of 168 mAh/g (i.e., 1 C=168 mAh·g−1) for anatase.

Figure 1:
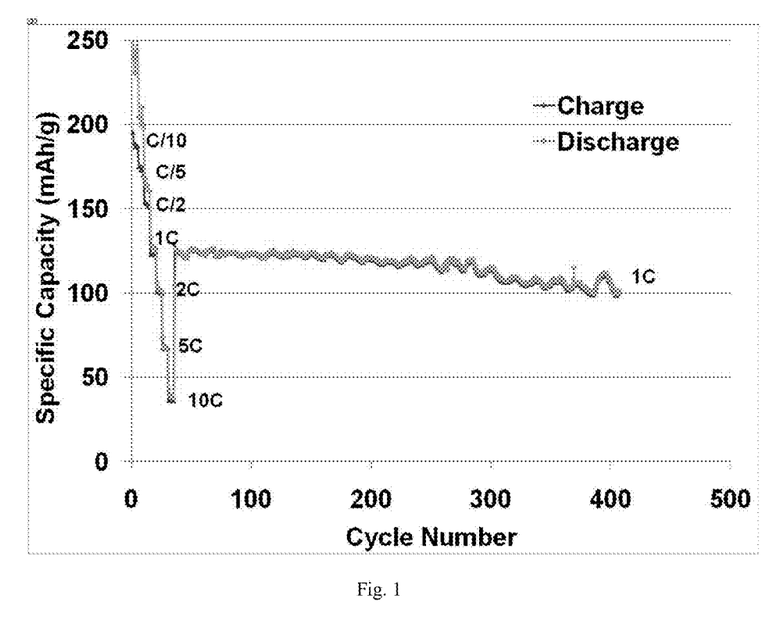
FIG. 1 is a graph of the cycling performance of TiO2/Graphene composite electrodes made by one embodiment of the present invention at various C rates using 2.6 micron graphene.
Figure 2:
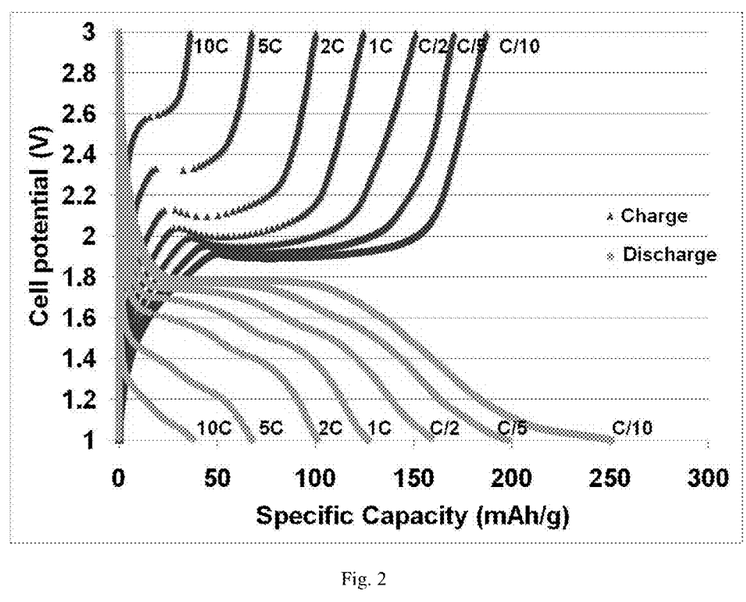
FIG. 2 is a graph of the charge/discharge voltage profiles of TiO2/Graphene composite electrode at various C rates of between C/10 and 10 C using 2.6 micron graphene.

FIGS. 1-4 show the measured specific capacity at various C rates and voltage profiles for the half cells prepared using this method. FIGS. 1 and 2 were measured on titania/graphene composites made from graphene with an average particle size of 2.6 µm. The samples had high initial capacity (>170 mAh/g at C/10) and good rate capability (>100 mAh/g at 2 C). Less that 5% capacity fade occurred after 200 cycles at 1 C, after which the fading rate increased slightly. The sample retained a specific capacity of approximately 100 mAhr/g after 400 hours cycling at 1 C.

Figure 3:
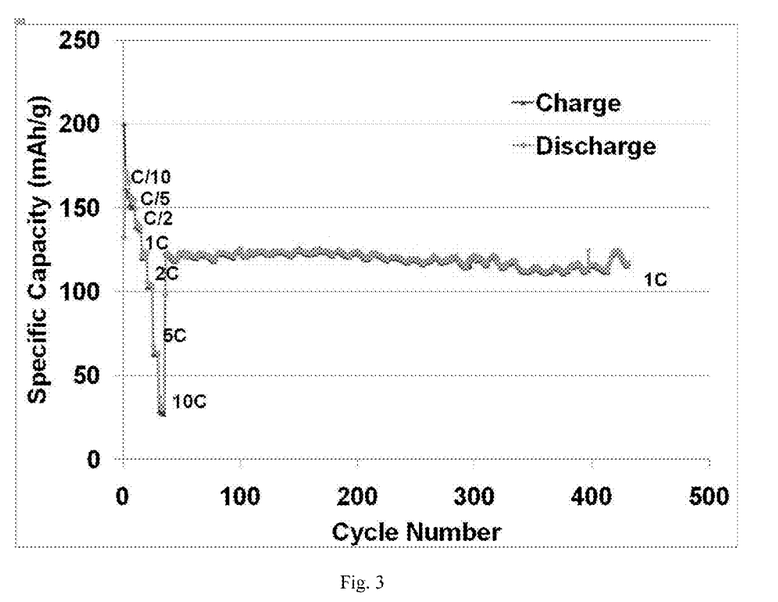
FIG. 3 is a graph of the cycling performance of TiO2/Graphene composite electrodes made by one embodiment of the present invention at various C rates using 11.6 micron graphene.
Figure 4:
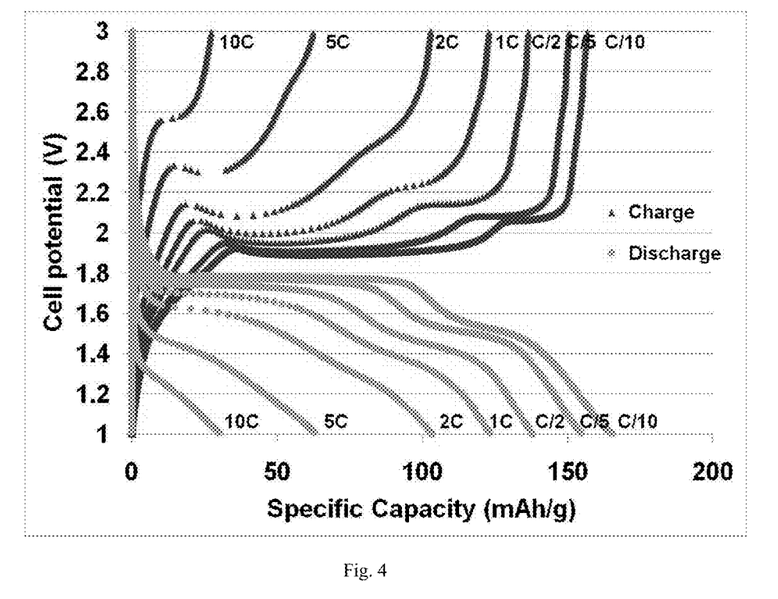
FIG. 4 is a graph of the charge/discharge voltage profiles of TiO2/Graphene composite electrode at various C rates of between C/10 and 10 C using 11.6 micron graphene.

The data in FIGS. 3 and 4 was collected on titania/graphene composites made from graphene with an average particle size of 11.6 µm. These samples had even better specific capacity, rate performance and cycling stability than those prepared using the smaller (2.6 µm) graphene particles. Negligible fade occurs after 400 cycles at 1 C in these samples. While the invention has been illustrated and described in detail in the drawings and foregoing description, the same is to be considered as illustrative and not restrictive in character. Only certain embodiments have been shown and described, and all changes, equivalents, and modifications that come within the spirit of the invention described herein are desired to be protected. Any experiments, experimental examples, or experimental results provided herein are intended to be illustrative of the present invention and should not be considered limiting or restrictive with regard to the invention scope. Further, any theory, mechanism of operation, proof, or finding stated herein is meant to further enhance understanding of the present invention and is not intended to limit the present invention in any way to such theory, mechanism of operation, proof, or finding.

Thus, the specifics of this description and the attached drawings should not be interpreted to limit the scope of this invention to the specifics thereof. Rather, the scope of this invention should be evaluated with reference to the claims appended hereto. In reading the claims it is intended that when words such as "a", "an", "at least one", and "at least a portion" are used there is no intention to limit the claims to only one item unless specifically stated to the contrary in the claims. Further, when the language "at least a portion" and/or "a portion" is used, the claims may include a portion and/or the entire items unless specifically stated to the contrary. Likewise, where the term "input" or "output" is used in connection with an electric device or fluid processing unit, it should be understood to comprehend singular or plural and one or more signal channels or fluid lines as appropriate in the context. Finally, all publications, patents, and patent applications cited in this specification are herein incorporated by reference to the extent not inconsistent with the present disclosure as if each were specifically and individually indicated to be incorporated by reference and set forth in its entirety herein.

The invention claimed is:

1. A method for forming a nanocomposite material comprising the steps of:
   dispersing qraphene with a surfactant forming a first mixture;
   providing a metal oxide in an aqueous solution to form a second mixture;
   adding the second mixture to the first mixture to form a metal oxide and qraphene nanocomposite;
   adding the metal oxide and graphene nanocomposite to a solvent to form a suspension;
   applying the suspension to a current collector; and
   evaporating the solvent to form a dried metal oxide and graphene nanocomposite material wherein the metal oxide is in electrical communication with at least one graphene layer.

2. The method of claim 1 wherein the solvent is an organic solvent.

3. The method of claim 1 wherein the metal oxide is titania.

4. The method of claim 1 wherein the titania is provided as particles having an average diameter below 50 nm.

5. The method of claim 1 wherein the titania is provided as particles having an average diameter below 10 nm.

6. A method for forming a nanocomposite material comprising the steps of:
   dispersing graphene with a surfactant forming a first mixture;
   providing an aqueous second mixture of metal oxide;
   adding the second mixture to the first mixture to form a metal oxide and graphene nanocomposite;
   adding the metal oxide and graphene nanocomposite to solvent to form a suspension, applying the suspension to a current collector,
   evaporating the solvent to form an anode,
   connecting the anode to a cathode having lithium ions and an electrolyte to form a battery, and
   electrochemically cycling the anode to form a nanocomposite material comprising at least one metal oxide in electrical communication with at least one graphene layer.

7. The method of claim 6 wherein the solvent is an organic solvent.

8. The method of claim 6 wherein the metal oxide is titania.

9. The method of claim 6 wherein the titania is provided as particles having an average diameter below 50 nm.

10. The method of claim 6 wherein the titania is provided as particles having an average diameter below 10 nm.

11. A method for forming a nanocomposite material comprising:
   dispersing graphene with a surfactant to form a first mixture;
   mixing titanium dioxide and water to form a second mixture;
   combining the second mixture into the first mixture to form a suspension;
   filtering the suspension and calcining the residue to form a titanium dioxide and graphene nanocomposite material wherein the titanium dioxide is in electrical communication with at least one graphene layer;
   mixing the titanium dioxide and graphene nanocomposite material with a solvent to form a slurry;
   applying the slurry to a current collector; and
   evaporating the solvent to form an anode.

12. The method of claim 11 wherein the solvent comprises an organic solvent.

13. The method of claim 11 wherein the solvent comprises poly(tetrafluoroethylene).

14. The method of claim 11 wherein the surfactant comprises cetyl trimethylammonium bromide.

15. The method of claim 11 wherein the ratio of titanium dioxide to graphene in the titanium dioxide and graphene nanocomposite material is from about 72/28 wt % to about 90/10 wt %.

16. The method of claim 1 wherein the ratio of titanium dioxide to graphene in the titanium dioxide and graphene nanocomposite material is from about 72/28 wt % to about 90/10 wt %.

* * * * *

UNITED STATES PATENT AND TRADEMARK OFFICE
CERTIFICATE OF CORRECTION

PATENT NO. : 8,557,441 B2  
APPLICATION NO. : 12/901527  
DATED : October 15, 2013  
INVENTOR(S) : Jun Liu et al.

Page 1 of 2

It is certified that error appears in the above-identified patent and that said Letters Patent is hereby corrected as shown below:

Title Page:

Under Item (56) References Cited,

Page 2, column 2, lines 39-48,

Other Publications:

Walker Reference,
"http://books.google.com/books?id=fhRX6IFg2fcC&pg=PT278lpg=PT278&dq=%22Surfactants+are+compounds+that+lower+the+surface+tension+of+a+liquid%22+-2012+-2011+-2010+-2009&source=bl&ots=cVS1AJ-GOS&sig=e9wgCJkhGYTe2zdqoq11y-iQG1o&hl=en&sa=X&ei=-6ErUO6NO6Wo0AGh74D4Bw&ved=OCEUQ6AEwBA#v=onepage&q=%22Surfactants%20are%20compounds%20that%20lower%20the%20surface%20tension%20of%20a%20liquid%22%20-20-2012%20-2011%20-2010%20/2009&f=false"
should read
--http://books.google.com/books?id=fhRX6IFg2fcC&pg=PT278lpg=PT278&dq=%22Surfactants+are+compounds+that+lower+the+surface+tension+of+a+liquid%22+-2012+-2011+-2010+-2009&source=bl&ots=cVS1AJ-GOS&sig=e9wgCJkhGYTe2zdqoq11y-iQG1o&hl=en&sa=X&ei=-6ErUO6NO6Wo0AGh74D4Bw&ved=OCEUQ6AEwBA#v=onepage&q=%22Surfactants%20are%20compounds%20that%20lower%20the%20surface%20tension%20of%20a%20liquid%22%20-20-2012%20-2011%20-2010%20-2009&f=false--.

Signed and Sealed this  
Fifth Day of April, 2016

Michelle K. Lee  
*Director of the United States Patent and Trademark Office*

CERTIFICATE OF CORRECTION (continued)
U.S. Pat. No. 8,557,441 B2

Page 3, column 2, line 19,

Kou et al. Reference, "133(8):254-2547(Feb. 2011)." should read --133(8):2541-2547 (Feb. 2011).--

Page 3, column 2, line 33,

Li et al. Reference, "Processable aqueous dispersions of grapheme nanosheets" should read --Processable aqueous dispersions of graphene nanosheets--

<u>In the Specification:</u>

Column 1, line 41, "a metal oxides" should read --a metal oxide--.

Column 2, line 31, "material of the forgoing" should read --material of the foregoing--.

Column 2, line 56, "following drawing" should read --following drawings--.

Column 3, line 15, "inventive scope is" should read --inventive scope are--.

Column 3, line 58, "ultra highly purity" should read --ultra high purity--.

Column 4, line 37, "ultra highly purity" should read --ultra high purity--.

Column 4, line 48, "100 cycle" should read --100 cycles--.

Column 5, line 3, "ultra highly purity" should read --ultra high purity--.

Column 5, line 16, "that 5% capacity" should read --than 5% capacity--.

<u>In the Claims:</u>

Column 5, line 66, "dispersing qraphene" should read --dispersing graphene--.

Column 6, line 4, "qraphene nanocomposite" should read --graphene nanocomposite--.

Column 6, lines 27-28, "to solvent" should read --to a solvent--.